US012598256B2

(12) United States Patent
Sharma

(10) Patent No.: US 12,598,256 B2
(45) Date of Patent: Apr. 7, 2026

(54) DISRUPTED-SPEECH MANAGEMENT ENGINE FOR A MEETING MANAGEMENT SYSTEM

(71) Applicant: Microsoft Technology Licensing, LLC, Redmond, WA (US)

(72) Inventor: Mrinal Kumar Sharma, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

(21) Appl. No.: 17/843,731

(22) Filed: Jun. 17, 2022

(65) Prior Publication Data
US 2023/0412734 A1 Dec. 21, 2023

(51) Int. Cl.
*H04M 3/56* (2006.01)
*G06V 40/16* (2022.01)
(Continued)

(52) U.S. Cl.
CPC .......... *H04M 3/563* (2013.01); *G06V 40/168* (2022.01); *G10L 15/02* (2013.01); *G10L 15/063* (2013.01);
(Continued)

(58) Field of Classification Search
CPC ............ H04M 3/563; H04M 2201/405; G06V 40/168; G10L 15/02; G10L 15/063;
(Continued)

(56) References Cited

U.S. PATENT DOCUMENTS 9,826,929 B2 11/2017 Steinberg-Shapira et al.
10,524,715 B2 * 1/2020 Sahin ..................... A61B 5/165
(Continued)

OTHER PUBLICATIONS

Das, et al., "Stuttering Speech Disfluency Prediction using Explainable Attribution Vectors of Facial Muscle Movements", In Repository of arXiv:2010.01231v1, Oct. 2, 2020, pp. 1-10.
(Continued)

*Primary Examiner* — Phung-Hoang J Nguyen
(74) *Attorney, Agent, or Firm* — Shook, Hardy & Bacon L.L.P.

(57) ABSTRACT

Methods, systems, and computer storage media for providing a disrupted-speech assistance service associated with a disrupted-speech management engine of a meeting management system. The disrupted-speech assistance service is an accessibility service that supports accessibility operations of a disrupted-speech management engine to provide disrupted-speech assistance features in a meeting management system. In operation, meeting data comprising audio data is accessed. The audio data is analyzed to determine that the audio data comprises disrupted-speech at a threshold level of disrupted-speech. Based on the audio data comprising disrupted-speech at the threshold level of disrupted-speech, one or more disrupted-speech assistance operations for a meeting can be executed. The one or more disrupted-speech assistance operations comprises identifying a disrupted-speech word; determining an alternative word for the disrupted-speech word. A disrupted-speech assistance interface is generated based on the one or more disrupted-speech assistance operations. The disrupted-speech assistance interface comprises the alternative word for the disrupted-speech word.

19 Claims, 13 Drawing Sheets

(51) Int. Cl.

| | |
|---|---|
| *G10L 15/02* | (2006.01) |
| *G10L 15/06* | (2013.01) |
| *G10L 15/22* | (2006.01) |
| *G10L 25/57* | (2013.01) |
| *H04L 65/403* | (2022.01) |
| *H04L 65/80* | (2022.01) |

(52) U.S. Cl.
CPC .............. *G10L 15/22* (2013.01); *G10L 25/57* (2013.01); *H04L 65/403* (2013.01); *H04L 65/80* (2013.01); *G10L 2015/025* (2013.01); *H04M 2201/405* (2013.01)

(58) Field of Classification Search
CPC ... G10L 15/22; G10L 25/57; G10L 2015/025; H04L 65/403; H04L 65/80; G09B 21/00; G09B 19/04
See application file for complete search history.

(56) References Cited

U.S. PATENT DOCUMENTS

| | | | |
|---|---|---|---|
| 10,770,069 | B2 | 9/2020 | Mithra et al. |
| 11,024,297 | B2 | 6/2021 | Aravamudan et al. |
| 11,594,149 | B1 * | 2/2023 | Edalat ..................... G10L 25/66 |
| 2019/0043490 | A1 * | 2/2019 | Rivlin .................... G10L 15/197 |
| 2019/0087870 | A1 * | 3/2019 | Gardyne ............ H04N 21/2743 |
| 2019/0311732 | A1 * | 10/2019 | Vadassery .............. G09B 19/04 |
| 2020/0090809 | A1 * | 3/2020 | Baughman ............. G06N 20/00 |
| 2021/0065582 | A1 | 3/2021 | Liao et al. |
| 2021/0315516 | A1 | 10/2021 | Rattehalli et al. |

OTHER PUBLICATIONS

Sheikh, et al., "Machine Learning for Stuttering Identification: Review, Challenges & Future Directions", In Repository of arXiv:2107.04057v2, Jul. 12, 2021, pp. 1-27.

Xu, Ronald, "A Stuttering Degree Diagnosis Tool Based on a Neural Network Model Trained with Multimodal Data", In Journal of Editorial Board, Dec. 13, 2020, 4 Pages.

Ghai, et al., "Fluent: An AI Augmented Writing Tool for People who Stutter", In Proceedings of the 23rd International ACM SIGACCESS Conference on Computers and Accessibility, Oct. 18, 2021, 8 Pages.

"International Search Report and Written Opinion Issued in PCT Application No. PCT/US23/019692", Mailed Date: Aug. 2, 2023, 14 Pages.

* cited by examiner

100

150

SPEAKER-ATTENDEE DEVICE

160

ATTENDEE DEVICE

MEETING MANAGEMENT ENGINE

110

DISRUPTED-SPEECH MANAGEMENT ENGINE
120

DISRUPTED-SPEECH ASSISTANCE OPERATIONS
122

DISRUPTED-SPEECH MACHINE LEARNING ENGINE
124

DISRUPTED-SPEECH ASSISTANCE INTERFACE ENGINE
126

MEETING DATA
130

DISRUPTED-SPEECH DATA
140

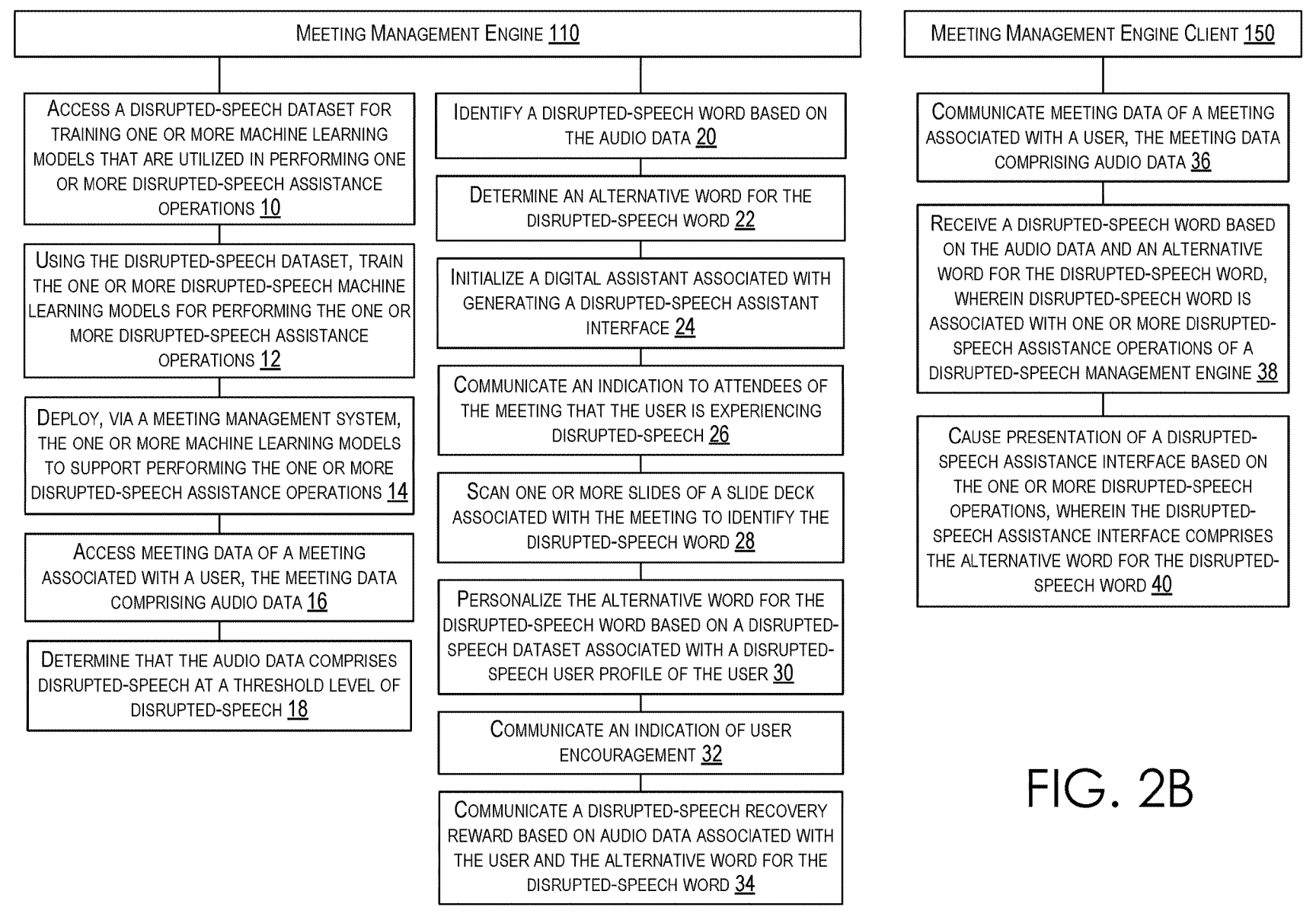

MEETING MANAGEMENT ENGINE CLIENT 150

COMMUNICATE MEETING DATA OF A MEETING ASSOCIATED WITH A USER, THE MEETING DATA COMPRISING AUDIO DATA 36

RECEIVE A DISRUPTED-SPEECH WORD BASED ON THE AUDIO DATA AND AN ALTERNATIVE WORD FOR THE DISRUPTED-SPEECH WORD, WHEREIN DISRUPTED-SPEECH WORD IS ASSOCIATED WITH ONE OR MORE DISRUPTED-SPEECH ASSISTANCE OPERATIONS OF A DISRUPTED-SPEECH MANAGEMENT ENGINE 38

CAUSE PRESENTATION OF A DISRUPTED-SPEECH ASSISTANCE INTERFACE BASED ON THE ONE OR MORE DISRUPTED-SPEECH OPERATIONS, WHEREIN THE DISRUPTED-SPEECH ASSISTANCE INTERFACE COMPRISES THE ALTERNATIVE WORD FOR THE DISRUPTED-SPEECH WORD 40

MEETING MANAGEMENT ENGINE 110

ACCESS A DISRUPTED-SPEECH DATASET FOR TRAINING ONE OR MORE MACHINE LEARNING MODELS THAT ARE UTILIZED IN PERFORMING ONE OR MORE DISRUPTED-SPEECH ASSISTANCE OPERATIONS 10

USING THE DISRUPTED-SPEECH DATASET, TRAIN THE ONE OR MORE DISRUPTED-SPEECH MACHINE LEARNING MODELS FOR PERFORMING THE ONE OR MORE DISRUPTED-SPEECH ASSISTANCE OPERATIONS 12

DEPLOY, VIA A MEETING MANAGEMENT SYSTEM, THE ONE OR MORE MACHINE LEARNING MODELS TO SUPPORT PERFORMING THE ONE OR MORE DISRUPTED-SPEECH ASSISTANCE OPERATIONS 14

ACCESS MEETING DATA OF A MEETING ASSOCIATED WITH A USER, THE MEETING DATA COMPRISING AUDIO DATA 16

DETERMINE THAT THE AUDIO DATA COMPRISES DISRUPTED-SPEECH AT A THRESHOLD LEVEL OF DISRUPTED-SPEECH 18

IDENTIFY A DISRUPTED-SPEECH WORD BASED ON THE AUDIO DATA 20

DETERMINE AN ALTERNATIVE WORD FOR THE DISRUPTED-SPEECH WORD 22

INITIALIZE A DIGITAL ASSISTANT ASSOCIATED WITH GENERATING A DISRUPTED-SPEECH ASSISTANT INTERFACE 24

COMMUNICATE AN INDICATION TO ATTENDEES OF THE MEETING THAT THE USER IS EXPERIENCING DISRUPTED-SPEECH 26

SCAN ONE OR MORE SLIDES OF A SLIDE DECK ASSOCIATED WITH THE MEETING TO IDENTIFY THE DISRUPTED-SPEECH WORD 28

PERSONALIZE THE ALTERNATIVE WORD FOR THE DISRUPTED-SPEECH WORD BASED ON A DISRUPTED-SPEECH DATASET ASSOCIATED WITH A DISRUPTED-SPEECH USER PROFILE OF THE USER 30

COMMUNICATE AN INDICATION OF USER ENCOURAGEMENT 32

COMMUNICATE A DISRUPTED-SPEECH RECOVERY REWARD BASED ON AUDIO DATA ASSOCIATED WITH THE USER AND THE ALTERNATIVE WORD FOR THE DISRUPTED-SPEECH WORD 34

FIG. 2B

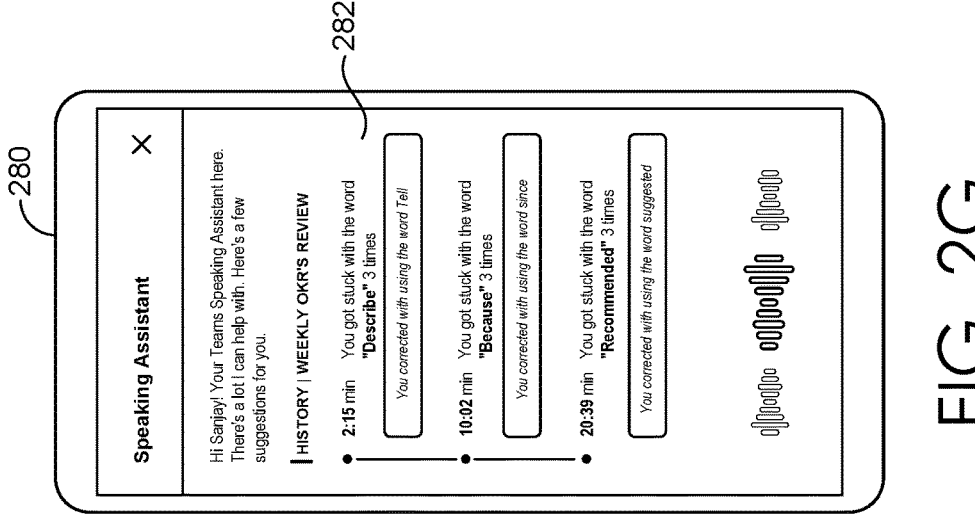
FIG. 2G
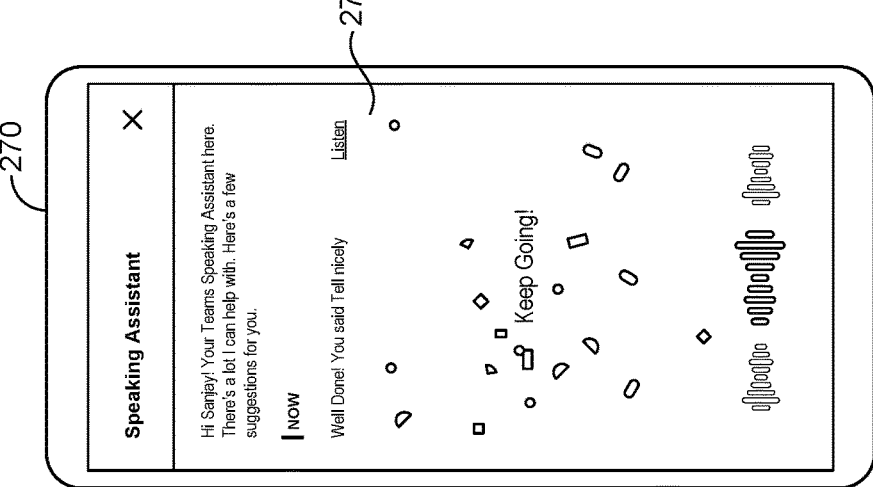
FIG. 2F
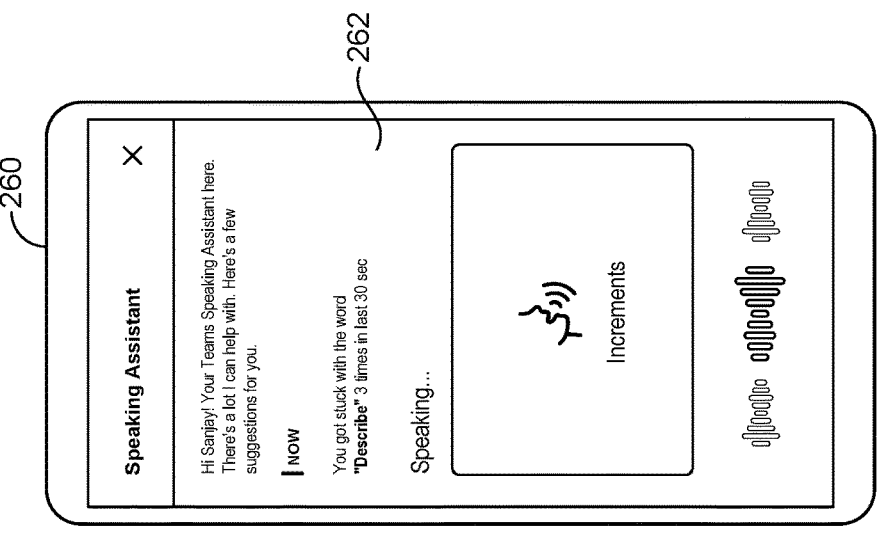
FIG. 2E

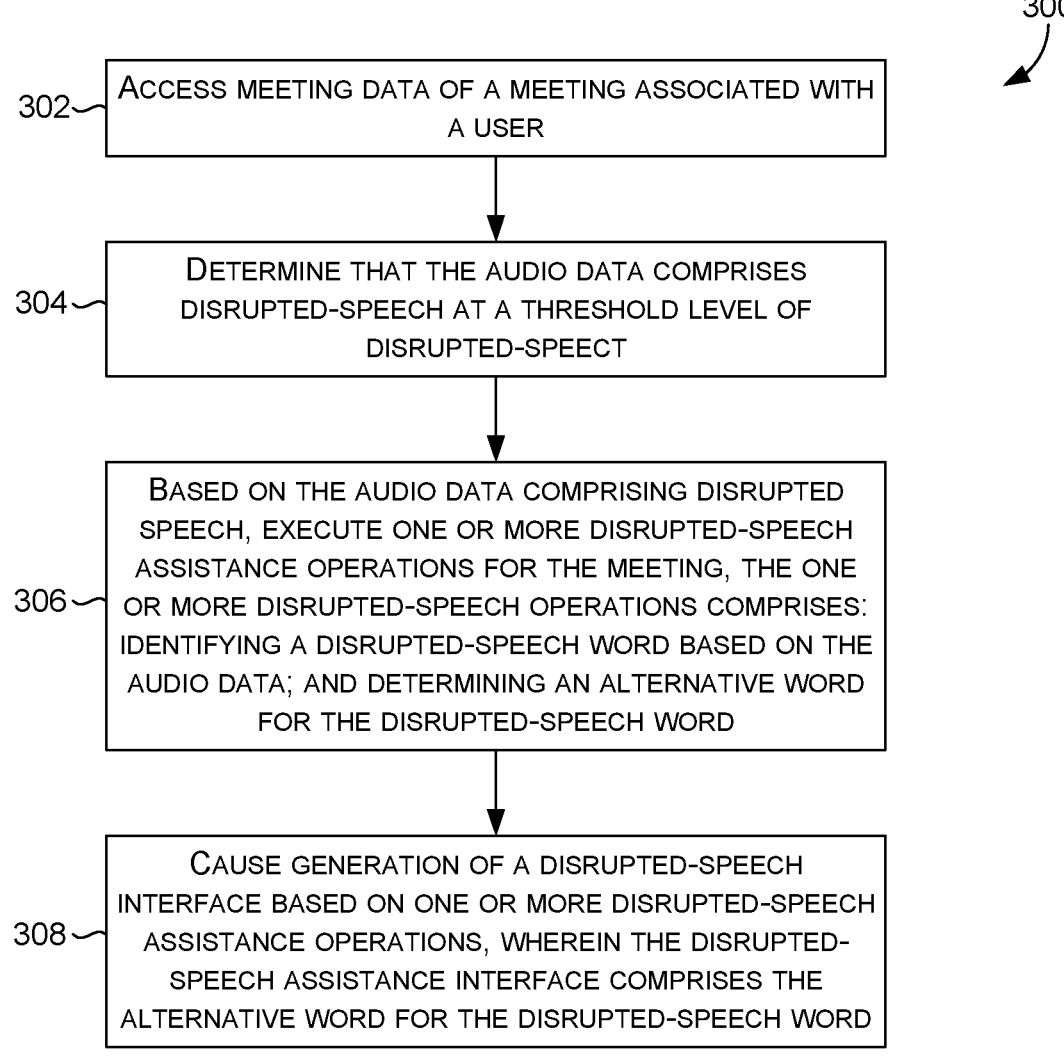

300

302 — Access meeting data of a meeting associated with a user

304 — Determine that the audio data comprises disrupted-speech at a threshold level of disrupted-speect 306 — Based on the audio data comprising disrupted speech, execute one or more disrupted-speech assistance operations for the meeting, the one or more disrupted-speech operations comprises: identifying a disrupted-speech word based on the audio data; and determining an alternative word for the disrupted-speech word 308 — Cause generation of a disrupted-speech interface based on one or more disrupted-speech assistance operations, wherein the disrupted-speech assistance interface comprises the alternative word for the disrupted-speech word

FIG. 3

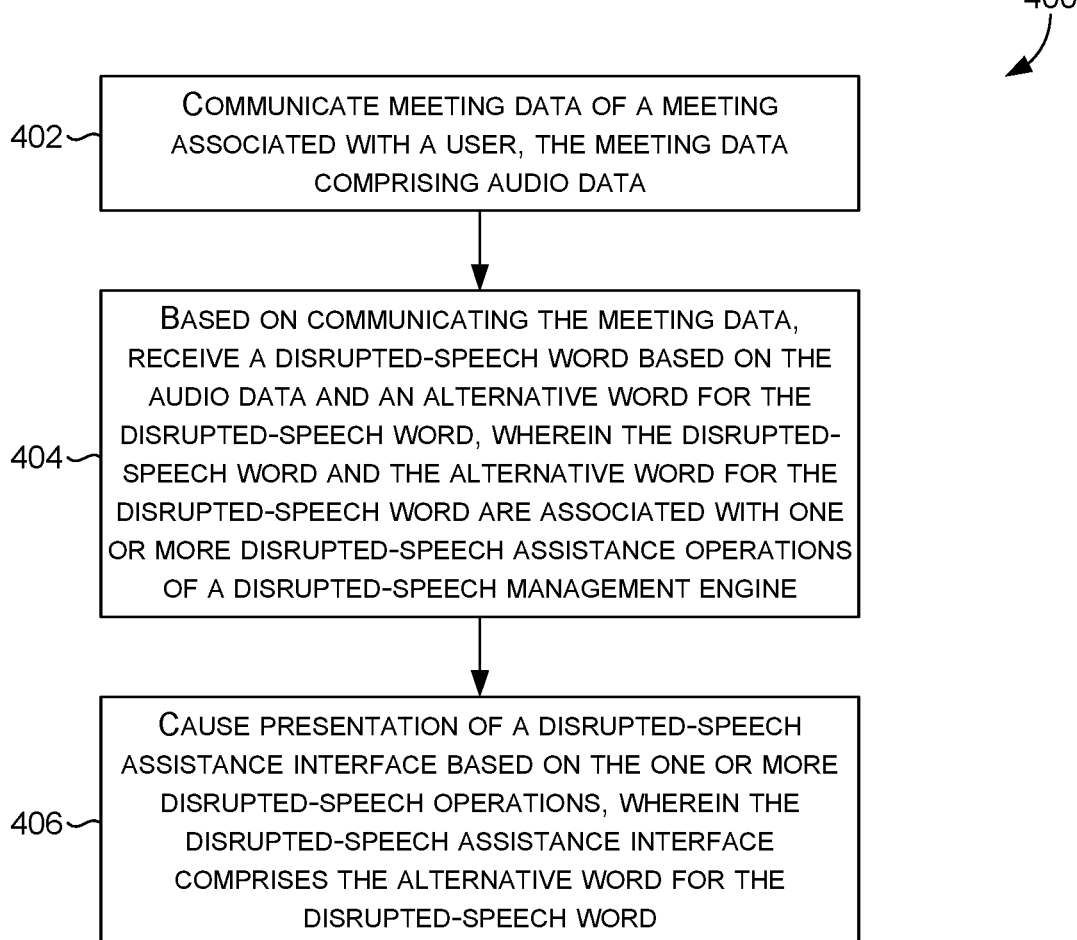

400

402 — COMMUNICATE MEETING DATA OF A MEETING ASSOCIATED WITH A USER, THE MEETING DATA COMPRISING AUDIO DATA

404 — BASED ON COMMUNICATING THE MEETING DATA, RECEIVE A DISRUPTED-SPEECH WORD BASED ON THE AUDIO DATA AND AN ALTERNATIVE WORD FOR THE DISRUPTED-SPEECH WORD, WHEREIN THE DISRUPTED-SPEECH WORD AND THE ALTERNATIVE WORD FOR THE DISRUPTED-SPEECH WORD ARE ASSOCIATED WITH ONE OR MORE DISRUPTED-SPEECH ASSISTANCE OPERATIONS OF A DISRUPTED-SPEECH MANAGEMENT ENGINE

406 — CAUSE PRESENTATION OF A DISRUPTED-SPEECH ASSISTANCE INTERFACE BASED ON THE ONE OR MORE DISRUPTED-SPEECH OPERATIONS, WHEREIN THE DISRUPTED-SPEECH ASSISTANCE INTERFACE COMPRISES THE ALTERNATIVE WORD FOR THE DISRUPTED-SPEECH WORD

FIG. 4

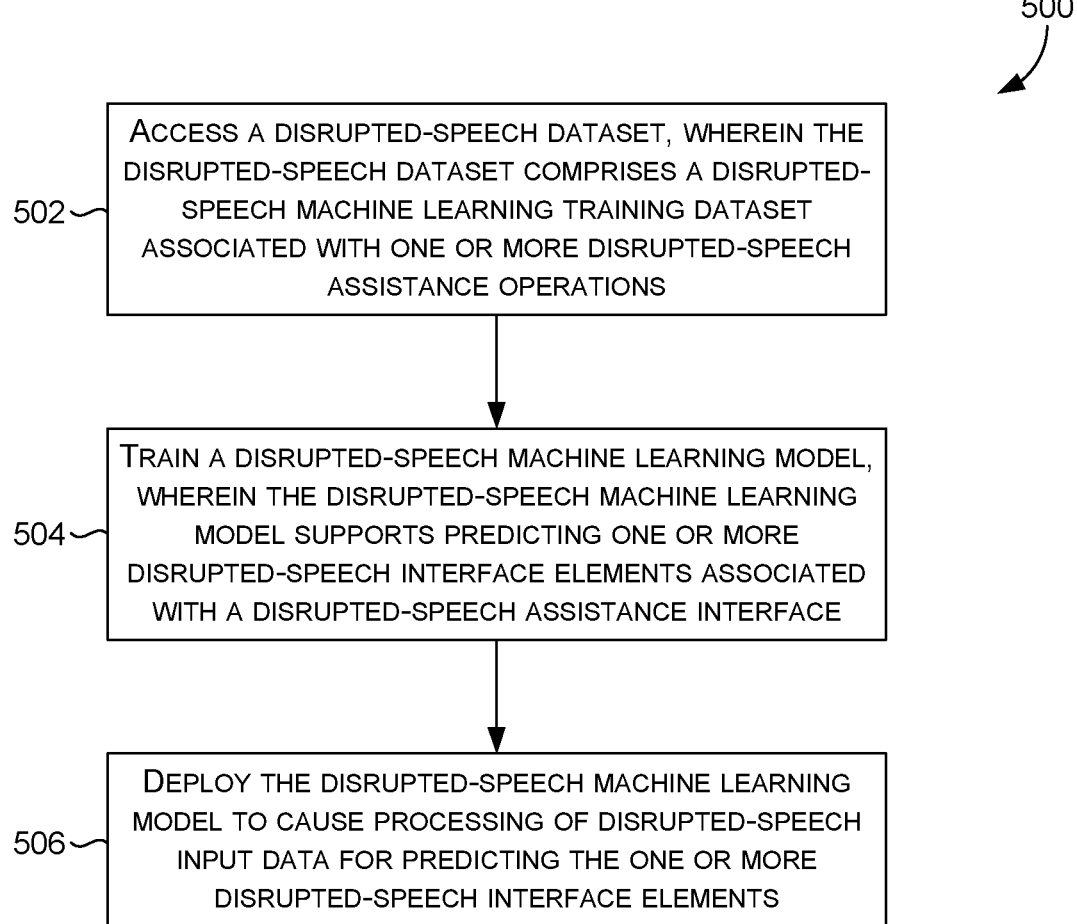

502 — ACCESS A DISRUPTED-SPEECH DATASET, WHEREIN THE DISRUPTED-SPEECH DATASET COMPRISES A DISRUPTED-SPEECH MACHINE LEARNING TRAINING DATASET ASSOCIATED WITH ONE OR MORE DISRUPTED-SPEECH ASSISTANCE OPERATIONS

504 — TRAIN A DISRUPTED-SPEECH MACHINE LEARNING MODEL, WHEREIN THE DISRUPTED-SPEECH MACHINE LEARNING MODEL SUPPORTS PREDICTING ONE OR MORE DISRUPTED-SPEECH INTERFACE ELEMENTS ASSOCIATED WITH A DISRUPTED-SPEECH ASSISTANCE INTERFACE

506 — DEPLOY THE DISRUPTED-SPEECH MACHINE LEARNING MODEL TO CAUSE PROCESSING OF DISRUPTED-SPEECH INPUT DATA FOR PREDICTING THE ONE OR MORE DISRUPTED-SPEECH INTERFACE ELEMENTS

DISRUPTED-SPEECH MANAGEMENT ENGINE FOR A MEETING MANAGEMENT SYSTEM

BACKGROUND

Users rely on applications and services to facilitate remote and virtual meetings. Distributed computing systems (e.g., cloud computing platforms) can host a content management system that supports network access to meeting content. A meeting management system can be part of a content management system in a distributed computing system that provides different types of productivity tools from word processing to task management. The meeting management system can operate as part of the content management system to provide teleconferencing, telecommuting, distance education, and social relations services. In particular, the meeting management system performs computing tasks to facilitate meetings. For example, a meeting management system can support video calls and meeting operations including attendance tracking, user session recording and distribution of meeting content.

Conventionally, meeting management systems are not configured with computing infrastructure and logic to handle a user-based disruption in speech (e.g., stuttering or other speech impairments that are a type of communication disorder in which normal speech is disrupted). For example, a meeting management system can be implemented with video-telephony, transcriptions services, and chat services but without speech disorder assistance services. Meeting management systems do not adequately include computing-based solutions for addressing speech impairments of users, thus limiting effective communication between users. As such, a more comprehensive meeting management system—with an alternative basis for performing meeting management operations—can improve computing operations and interfaces in meeting management systems.

SUMMARY

Various aspects of the technology described herein are generally directed to systems, methods, and computer storage media, for among other things, providing a disrupted-speech assistance service associated with a disrupted-speech management engine of a meeting management system. The disrupted-speech assistance service is an accessibility service that supports accessibility features—of a disrupted-speech management engine—to provide disrupted-speech assistance operations in a meeting management system. For example, a virtual assistant can be programmed to perform tasks and generate disrupted-speech assistance user interfaces based on identified instances of disrupted-speech associated with a user. The disrupted-speech management engine operates to identify the user associated with disrupted-speech, manage disrupted-speech user profile data for providing disrupted-speech assistance services, and provide disrupted-speech assistance operations and user interfaces (e.g., suggested words and real-time feedback) based on observed disrupted-speech interactions. In this way, the disrupted-speech assistance service can improve communication between a speaker-attendee (i.e., user with speech impairment) and the attendees (i.e., listeners in a meeting).

Conventionally, meeting management systems are not configured with computing infrastructure and logic to handle a user-based disruption in speech (e.g., stuttering or other speech impairments that are a type of communication disorder in which normal speech is disrupted). A technical solution—to the limitations of conventional meeting management system operations—provides a disrupted-speech assistance service associated with a disrupted-speech management engine of a meeting management system. In operation, meeting data comprising audio data is accessed. The audio data is analyzed to determine that the audio data comprises disrupted-speech at a threshold level of disrupted-speech. Based on the audio data comprising disrupted-speech at the threshold level of disrupted-speech, one or more disrupted-speech assistance operations for the meeting can be executed. The one or more disrupted-speech assistance operations comprises identifying a disrupted-speech word; determining an alternative word for the disrupted-speech word. A disrupted-speech assistance interface is generated based on the one or more disrupted-speech assistance operations. The disrupted-speech assistance interface comprises the alternative word for the disrupted-speech word.

In addition, in some embodiments, a client device communicates meeting data of a meeting associated with a user, the meeting data comprising audio data. Based on communicating the meeting data, the client device receives a disrupted-speech word based on the audio data and an alternative word for the disrupted-speech word. The disrupted-speech word and the alternative word for the disrupted-speech word are associated with one or more disrupted-speech assistance operations of a disrupted-speech management engine. The client device causes presentation of a disrupted-speech assistance interface based on the one or more disrupted-speech assistance operations, the disrupted-speech assistance interface comprises the alternative word for the disrupted-speech word.

Moreover, in some embodiments, the disrupted-speech management engine supports performing disrupted-speech assistance operations and providing disrupted-speech assistance interfaces associated with the disrupted-speech assistance operations. The disrupted-speech assistance operations include any of the following: initializing a digital assistant associated with generating the disrupted-speech assistance interface; communicating an indication to attendees of the meeting that the user is experiencing disrupted-speech; scanning one or more slides of a slide deck associated with the meeting to identify the disrupted-speech word; personalizing the alternative word for the disrupted-speech word based on a disrupted-speech dataset associated with a disrupted-speech user profile of the user; communicating an indication of user encouragement; and communicating a disrupted-speech recovery reward based on audio data associated with the user and the alternative word.

The disrupted-speech assistance interfaces include any of the following: a digital assistant interface comprising the disrupted-speech word and the alternative word; an indication to the attendees that the speaker is experiencing disrupted-speech; an indication of user encouragement; and a disrupted-speech timeline comprising one or more instances of disrupted speech, where an instance of disrupted speech is associated with a timestamp and a count of a number times the disrupted-speech word was repeated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIGS. 2A and 2B are block diagrams of an exemplary meeting management system with a disrupted-speech management engine, in which embodiments described herein may be employed;

FIGS. 2C-2G are exemplary schematics associated with a meeting management system with a disrupted-speech management engine, in which embodiments described herein may be employed;

FIG. 3 is a flow diagram showing an exemplary method for implementing a meeting management system with a disrupted-speech management engine, in accordance with embodiments described herein;

FIG. 4 is a flow diagram showing an exemplary method for implementing a meeting management system with a disrupted-speech management engine, in accordance with embodiments described herein;

FIG. 5 is a flow diagram showing an exemplary method for implementing a meeting management system with a disrupted-speech management engine, in accordance with embodiments described herein;

DETAILED DESCRIPTION OF THE INVENTION

Overview

Meeting management systems operate within a content management system to provide teleconferencing, telecommuting, distance education, and social relations services. In particular, meeting management systems provide access to a content management system and perform computing tasks to facilitate meetings. For example, meeting management systems support scheduling, attendance tracking, user session mediation, and recording and distributing meeting content (e.g., audio and visual content, transcriptions of same, presentation materials). Conventionally, meeting management systems are not configured with computing infrastructure and logic to handle a user-based disruption in speech (e.g., stuttering or other speech impairments that are a type of communication disorder in which normal speech is disrupted). Conventional meeting management systems provide functionality associated with assisting video-telephony and technical disruptions associated with video-telephony functionality. For example, a meeting management system can indicate that a speaking attendee is muted, when the attendee is speaking, or indicate that an attendee device currently has an unstable internet connection. Such meeting management systems do not adequately include computing-based solutions for addressing speech impairments of users, thus limiting effective communication between users.

Moreover, conventional meeting management systems do not provide a computing infrastructure for accessibility services that are designed to work with people who experience speech impairments. Currently, a meeting management system can be ineffective in receiving and communicating from users with speech impairments and other attendees using the meeting management system. For example, attendees simply has to guess whether the user has a speech impairment—without any assistance from the meeting management system. The user with the speech impairment also has no assistive features that can facilitate their communication via the meeting management system. Developing a technical solution to improve meeting management systems can be challenging in part because of the changes needed to the infrastructure and logic in meeting management system and further because of some the limitations identified above. As such, a more comprehensive meeting management system—with an alternative basis for performing meeting management operations—can improve computing operations and interfaces in meeting management systems.

Figure 1A:
FIGS. 1A and 1B are block diagrams of an exemplary meeting management system with a disrupted-speech management engine, in which embodiments described herein may be employed.
Figure 1B:
Figure 1C:
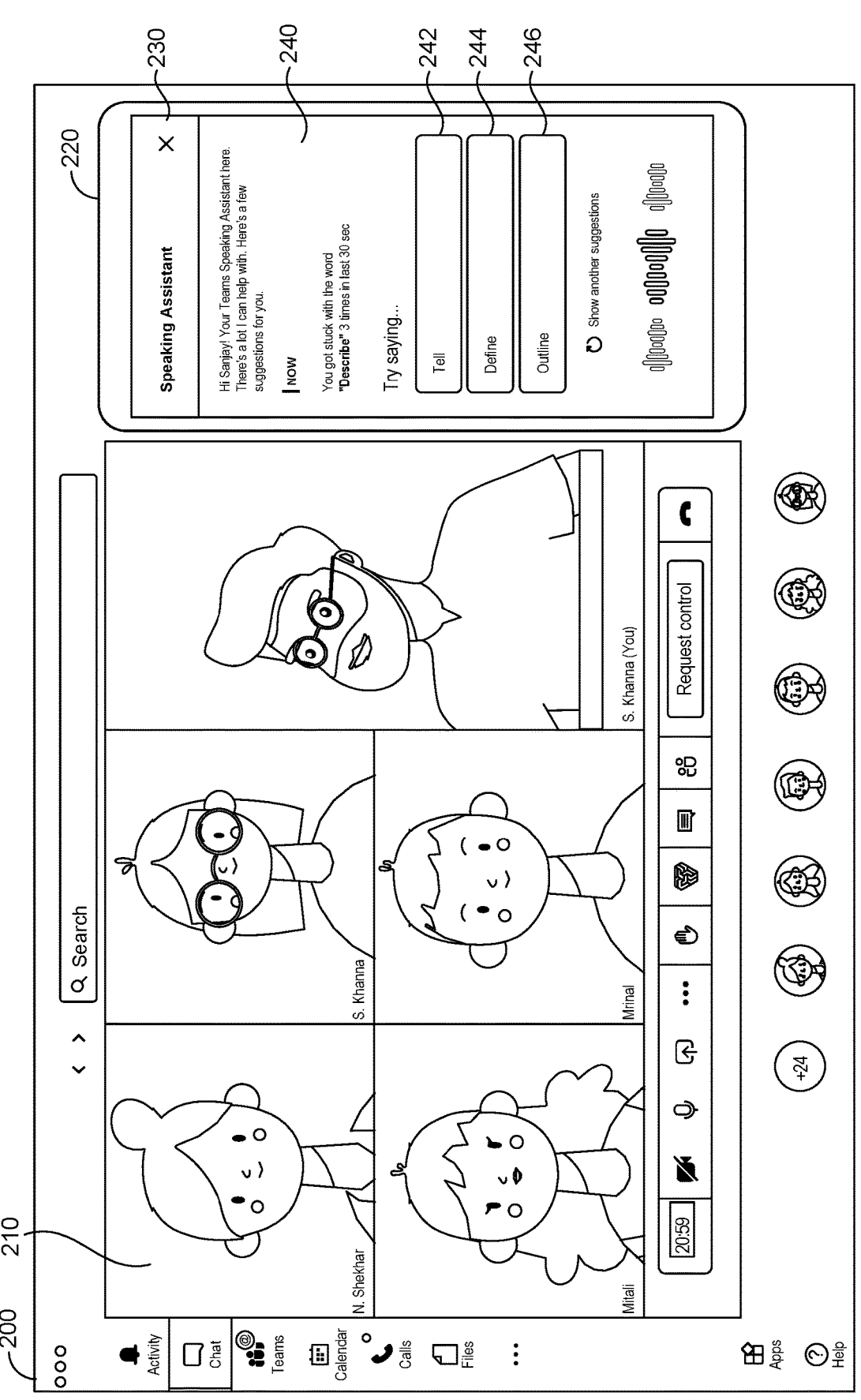
FIG. 1C is an exemplary schematic associated with a meeting management system with a disrupted-speech management engine, in which embodiments described herein may be employed.

Aspects of the technical solution can be described by way of examples and with reference to FIGS. 1A, 1B, and 1C. FIG. 1A illustrates a meeting management system 100, meeting management engine 110, disrupted-speech management engine 120, disrupted-speech data 130, meeting data 140, speaker-attendee device 150, and attendee device 160.

Users can access a meeting management system 110 that operates as a personal or business communication platform. The meeting management system provides a variety of functionality including chat and videoconferencing, file storage and application integration. The meeting management system can support a meeting management engine 110 and disrupted-speech management engine 120 that perform operations to support functionality of the meeting management system 119.

The meeting data 130 and disrupted-speech data 140 refers to operations data and data interface data associated with providing the disrupted-speech assistance service. Meeting data can be associated with features of the meeting management system 110 including chats, channels, group conversation, meetings, and telephony. Disrupted-speech data can be associated with a disrupted-speech digital assistant, disrupted-speech communications to attendees, evaluating presentations, data of a disrupted-speech user profile, disrupted-speech data tracking, and disrupted-speech machine learning datasets.

The speaker attendee device 150 or attendee device 160 can provide access to the meeting management system 100 and provide interfaces for presenting and receiving data associated with the disrupted-speech. For example, a user may use a client device (e.g., speaker attendee device 150 or attendee device 160) to access the meeting management system 110. The user can access the client device that operates with the meeting management engine 110 and disrupted-speech management engine 120 to process and generate meeting data 130 and disrupted-speech data 140 to support functionality of the disrupted speech assistance service.

With reference to FIG. 1B, FIG. 1B illustrates additional aspects of the meeting management engine 110. FIG. 1B includes the disrupted-speech management engine 120 having the disrupted-speech assistance operations 122, the disrupted-speech assistance machine-learning engine 124, and disrupted-speech assistance interface engine 126.

The disrupted-speech assistance operations 122 are executed to provide disrupted-speech management functionality associated with providing the disrupted-speech assistance service. The disrupted speech assistant service can be implemented as a framework that integrates meeting management system operations (e.g., MICROSOFT TEAMS operations) and virtual digital assistant operations (e.g., MICROSOFT CORTANA operations) to perform disrupted-speech assistance operations. The disruptive speech assistance service is integrated into the meeting management system 100 to adapt operations of the meeting management system and a virtual digital assistant to perform operations associated with disruptive speech assistance functionality (e.g., computing, operations, actions, user interfaces, and interactions). For example, a user may access a client device (e.g., speaker-attendee device 150 or attendee device) and cause communication of meeting data 130 to the meeting management engine 110. The meeting data 130 can include audio data and video data from a meeting associated with a plurality of users. The meeting data 130 can further include other types of user input data and tracking data of the plurality of users and their corresponding client devices during the meeting.

The disrupted-speech assistance operations are executed to evaluate meeting data (e.g., audio data and video data) to determine if a threshold level of disrupted-speech has been met. The threshold level can be associated with a threshold computing model (not shown) that is associated with a set of threshold values that are used to distinguish ranges of values for quantifying disrupted-speech. For example, a user with a slight stutter which is not habitual or not because of a speech impairment would not be determined—via audio data or video data—to meet a threshold level that triggers the disrupted-speech assistance services. However, a user with a speech impairment can trigger the disrupted-speech assistance services. The disrupted-speech assistance service can also be manually triggered by a user or based on data in a disrupted-speech user profile.

When a user has triggered the disrupted-speech assistance service, the disrupted-speech assistance operations can be executed to identify a disrupted-speech word based on the audio data and determine an alternative word for the disrupted-speech word. For example, a determination of a particular word or phrase associated with the disrupted-speech can be made so that an alternative word is provided to the user. Determining an alternative word can be based on a number of different computing techniques. For example, intrinsic data (e.g., data directly associated with the user) or extrinsic data (e.g., data not directly associated with user or not at all associated with user). In one embodiment, the disrupted-speech data can include a thesaurus dataset or an alternative word service that is accessed to identify one or more synonyms to a disrupted-speech word, such that the synonyms are provided as alternative words.

Additional disrupted-speech assistance operations can include initializing a digital assistant (i.e., a virtual digital assistant) associated with generating the disrupted-speech assistance interface; communicating an indication to attendees of the meeting that the user is experiencing disrupted-speech; scanning one or more slides of a slide deck associated with the meeting to identify the disrupted-speech word; personalizing the alternative word for the disrupted-speech word based on a disrupted-speech dataset associated with a disrupted-speech user profile of the user; communicating an indication of user encouragement; and communicating a disrupted-speech recovery reward based on audio data associated with the user and the alternative word.

Disrupted-speech machine learning engine 124 supports disrupted-speech assistance operations associated with machine learning. The disrupted-speech machine learning engine 124 can be used to train one or more machine learning models that are used in perform disrupted-speech assistance operations. A user may access the meeting management system 100 be tracked to generate disrupted-speech data. The user can be automatically tracked or manually provide information associated with disrupted-speech. For example, the user can be tracked to identify disrupted-speech words and alternative words for disrupted speech word; or the user can identify challenging words and alternative words for challenging words. The disrupted-speech machine learning engine 124 can be trained on disrupted-speech machine learning training data associated with disrupted-speech data to generate machine learning models that can make predictions on disrupted-speech input data. For example, a machine learning model can be trained to predict alternative words based on disrupted-speech input data associated with an ongoing meeting. In this way, as discussed in more detail below, different types of predictions can be made using machine learning models associated with the disrupted-speech machine learning engine 124.

The speaker-attendee device 150 can support presenting a disrupted-speech assistance interface associated with presenting disrupted-speech data and disrupted-speech interface elements of the disrupted-speech assistance service. The disrupted-speech assistance interfaces include any of the following: a digital assistant interface comprising the disrupted-speech word and the alternative word; an indication to the attendees that the speaker is experiencing disrupted-speech; an indication of user encouragement; and a disrupted-speech timeline comprising one or more instances of disrupted speech, where an instance of disrupted speech is associated with a timestamp and a count of a number times the disrupted-speech word was repeated. For example, a user on a client device (e.g., speaker-attendee device or attendee device) can access the meeting management system 110 and trigger the disrupted-speech assistance service to cause execution of disrupted-speech assistance operations; and the disrupted-speech assistance operations further cause generation of disrupted-speech interface data and disrupted-speech interface elements on the client device.

With reference to FIG. 1C, FIG. 1C illustrates aspects of the meeting management system 100 associated with providing the disrupted-speech assistance service. FIG. 1C includes a meeting management interface 200 of the meeting management system 100. The meeting management interface 200 includes a presentation interface portion 210 and a notifications interface portion 220. The notifications interface portion 220 can support presenting features of the disrupted-speech assistance service. As shown, the notifications interface portion 220 includes the digital assistant interface 230 and alternative word interface 240. The disrupted-speech management engine 120 can support causing generation (e.g., via a client device) of the meeting management interface 200 based on one or more disrupted-speech assistance operations. In particular, the notifications interface portion 220 can include the alternative word interface 240 having one or more alternative words (e.g., alternative word 242, alternative word 244, and alternative word 246) for a disrupted-speech word as a disrupted-speech interface element in the disrupted-speech interface element portion.

Figure 2A:
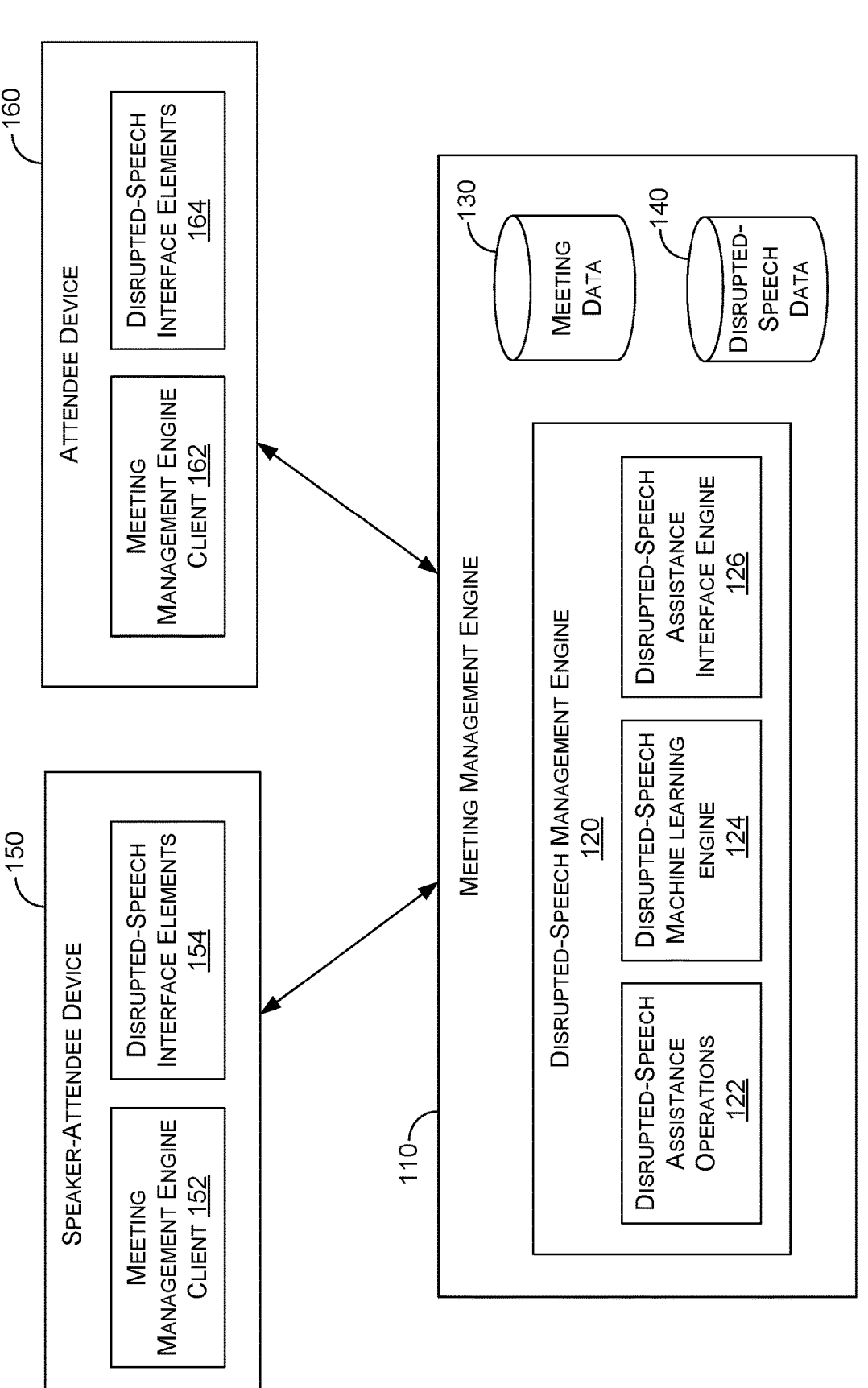

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example meeting management system 100 in which methods of the present disclosure may be employed. In particular, FIG. 2A shows a high level architecture of the meeting management system 100 in accordance with implementations of the present disclosure. Among other engines, managers, generators, selectors, or components not shown (collectively referred to herein as "components"), the technical solution environment of meeting management system 100 corresponds to FIGS. 1A and 1B.

With reference to FIG. 2A, FIG. 2A illustrates meeting management system 100 including a meeting management system 100, meeting management engine 110; disrupted-speech management engine 120 having the disrupted-speech assistance operations 122; the disrupted-speech assistance machine-learning engine 124; and disrupted-speech assistance interface engine 126; disrupted-speech data 130; meeting data 140; speaker-attendee device 150 having meeting management engine client 152 and disrupted-speech interface elements; attendee device 160 having meeting management client 162 and disrupted-speech interface elements 164.

The client devices (e.g., speaker-attendee device 150 and attendee device 160) can provide access to the meeting management engine 110 for a videoconferencing meeting. A meeting management engine client (e.g., meeting management engine client 152 and meeting management engine client 162) can be implemented to support accessing the meeting management engine 110 and providing functionality associated with a disrupted-speech assistance service. The client devices can communicate meeting data to the meeting management engine 110. Meeting data can include audio data and video data.

The disrupted-speech management engine 120 can access the meeting data and analyze the audio data and video data individually or collectively to determine whether a user has disrupted-speech. In particular, the disrupted-speech management engine 120 can analyze the audio data to determine whether the audio data includes disrupted-speech at a threshold level. The threshold level is based on an occurrence frequency of consecutive phonemes within a predefined period. A threshold quantifier can be based on a range of consecutive phonemes that identify different threshold levels (e.g., high, medium, and low).

The audio data can be supplemented with video data to determine whether the audio data includes disrupted-speech. For example, a plurality of features can be identified as features associated with users having disrupted-speech patterns. The video data can be analyzed to supplement the determination whether the audio data includes disrupted-speech at a threshold level. For example, identifying visual features in the video data, where the visual features are associated with disrupted-speech can support a determination that the audio data is associated with an instance of disrupted-speech. Other variations and combinations of using audio data and video data to determine whether a user (i.e., audio data and video data of the user) has disrupted-speech are contemplated with embodiments described herein.

The disrupted-speech management engine 120 can support executing one or more disrupted-speech assistance operations. The disrupted-speech management engine 120 can cause execution of the one or more disrupted-speech assistance operations based on determining that the user has disrupted-speech. It contemplated that the disrupted-speech management engine 120 can cause execution of the one or more disrupted-speech assistant operations without initially determining that the user has disrupted-speech (e.g., based on a manual indication to trigger the one or more disrupted-speech assistance operations). The disrupted-speech management engine 120 can identify a disrupted-speech word based on analyzing the audio data and then determining an alternative word for the disrupted-speech word. For example, the disrupted-speech management engine 120 can access disrupted-speech data to identify alternative words that correspond to the disrupted-speech word. An alternative word service (not shown) can support finding synonyms for words such that the one or more alternative words for a disrupted-speech word are identified. Other variations and combinations of techniques for identifying alternative words are contemplated with embodiments described herein.

Disrupted-speech machine learning engine 124 supports disrupted-speech assistance operations associated with machine learning. Machine learning approaches to disrupted-speech assistance services further allow learning from data and improving analysis. Operationally, developing a machine learning model for disrupted-speech assistance services can be performed via a machine learning engine that supports gathering training data, defining goals and metrics associated with training data features or attributes (e.g., word features, audio features, video features etc.) Machine learning techniques can include Long Short-Term Memory (LSTM), Random Forest, and Linear Regression to develop machine learning models. For example, a linear regression approach can help predict future values from past values based on identifying underlying trends, so using historical data, additional information about the specific words, audio, video and user, a prediction of a future value can be provided for a disrupted-speech assistance operation. The machine learning engine can further support training the machine learning models (i.e., using historical data and algorithms), validation (i.e., optimizing prediction model parameters and hyper-parameters), and deployment (e.g., integration into production use). The disrupted-speech machine learning engine 124 can be trained on disrupted-speech machine learning data associated with disrupted-speech data to generate machine learning models that can make predictions on disrupted-speech input data. For example, a machine learning model can be trained to predict alternative words based on disrupted-speech input data associated with an ongoing meeting. In this way, different types of predictions can be made using machine learning models associated with the disrupted-speech machine learning engine 124.

The disrupted-speech management engine 120 can further support initializing a digital assistant associated with generating the disrupted-speech assistance interface. The digital assistant can be implemented as an intelligent chat bot to facilitate performing other disrupted-speech assistance operations of the disrupted-speech assistance service. The disrupted-speech management engine 120 can further communicate an indication to attendees of the meeting that the user is experiencing disrupted-speech. In particular, upon determining that the user has disrupted-speech, or based on an input from the speaker-attendee indicating that they are experiencing an instance of disrupted-speech, the indication that the user is experiencing disrupted-speech can be communicated to the attendees.

The disrupted-speech management engine 120 can also support scanning one or more slides of a slide deck associated with the meeting to identify the disrupted-speech word. By way of illustration, identifying the disrupted-speech word can be supplemented by scanning an active slide deck to determine a disrupted-speech word that corresponds to the audio data and selecting the disputed-speech word from the slide deck to determine an alternative word. A user may type the particular disrupted-speech word and cause determination of the alternative word. Moreover, disrupted-speech management engine 120 can also support personalizing the alternative word for the disrupted-speech word based on a disrupted-speech dataset associated with a disrupted-speech user profile of the user. For example, the disrupted-speech data 130 can further include a disrupted-speech user profile (e.g., a user registered as having a speech impairment) that stores a plurality of attributes of the user that can support personalized performance of the one or more disrupted-speech assistance operations.

The disrupted-speech management engine 120 can also support communicating an indication of user encouragement, when a determination is made that the user has overcome an instance of disrupted-speech. The disrupted-speech management engine 120 can further communicate a disrupted-speech recovery reward based on audio data associated with the user and the alternative word. For example, based on determining that the user has correctly said a disrupted-speech word one or more times, a visual interface graphic can be generated to provide an indication of encouragement for successfully circumventing the disrupted-speech word. In this way, the disrupted-speech management engine 120 can track key disrupted-speech performance indicators that includes historical data of the user and instances of disrupted-speech. The historical data can be used to provide feedback to the user on the instance of disrupted-speech.

The client devices (e.g., speaker-attendee device 150 and attendee device 160) can provide support presenting a disrupted-speech assistance interface. As discussed in more detail below, the disrupted-speech assistance interface can be associated with causing presentation of the following: a digital assistant interface comprising the disrupted-speech word and the alternative word; an indication to attendees of the meeting that the user is experiencing disrupted-speech; an indication of user encouragement; and a disrupted-speech timeline comprising one or more instances of disrupted speech, where an instance of disrupted speech is associated with a timestamp and a count of a number times the disrupted-speech word was repeated. Other variations and combinations of disrupted-speech interface elements associated with the one or more disrupted-speech assistance operations are contemplated with embodiments described herein.

With reference to FIG. 2B, FIG. 2B illustrates meeting management engine 110 and meeting management engine client 152 that support providing a disrupted-speech assistance service associated with a disrupted-speech management engine. At block 10, access a disrupted-speech dataset for training one or more machine learning models that are utilized in performing one or more disrupted speech assistance operations. At block 12, using the disrupted-speech dataset, train one or more disrupted-speech machine learning models for performing the one or more disrupted-speech assistance operations. A disrupted-speech machine learning model supports predicting one or more disrupted-speech interface elements associated with a disrupted-speech assistance interface. At 14, deploy, via a meeting management system, the one or more machine learning models to support performing one or more disrupted-speech assistance operations.

At block 16, access meeting data of a meeting associated with a user. The meeting data comprises audio data. At block 18, determine that the audio data comprises disrupted-speech at a threshold level or disrupted-speech. At block 20, identify a disrupted-speech word based on the audio data. At block 22, determine an alternative word for the disrupted-speech word. At block 24, initialize a digital assistant associated with generating a disrupted-speech assistant interface.

At block 26, communicate an indication to attendees of the meeting that the user is experiencing disrupted-speech. At block 28, scan one or more slides of a slide deck associated with the meeting it identify the disrupted-speech word. At block 30, personalize the alternative word for the disrupted-speech word based on a disrupted-speech dataset associated with a disrupted-speech user profile of the user. At block 32, communicate an indication of user encouragement. At block 34, communicate a disrupted-speech recovery reward based on audio data associated with the user and the alternative word for the disrupted-speech word.

At block 36, communicate meeting data of a meeting associated with a user. The meeting data comprising audio data. At block 38, receive a disrupted-speech word based on the audio data and an alternative word for the disrupted-speech word. The disrupted-speech word is associated with one or more disrupted-speech assistance operations of a disrupted-speech management engine. At 40, cause presentation of a disrupted-speech assistance interface based on the one or more disrupted-speech assistance operations. The disrupted-speech assistance interface comprises the alternative word for the disrupted-speech word.

With reference to FIGS. 2C-2G, FIGS. 2C-2G illustrate aspects—interface representations—associated with the disrupted-speech management engine 120 and disrupted-speech assistance interface engine 124. At a high level, the disrupted-speech assistance interface engine 124 operates to generate interface data (e.g., disrupted-speech assistance interface elements). Interface data includes user interface elements, disrupted-speech assistance visualizations, and instructions on how to generate corresponding user interfaces that support interactions between users and the meeting management system.

User interfaces allow effective operation and control by users while the meeting management system 100 simultaneously perform computing operations. Interface data can include graphical user interfaces that allow users to interact with the meeting management system 100. A graphical user interface can include data visualization that that provides a visual display of disrupted-speech assistance data. The disrupted-speech assistance data can specifically include disrupted-speech assistance interface elements associated disrupted-speech assistance operations.

Figure 2C:
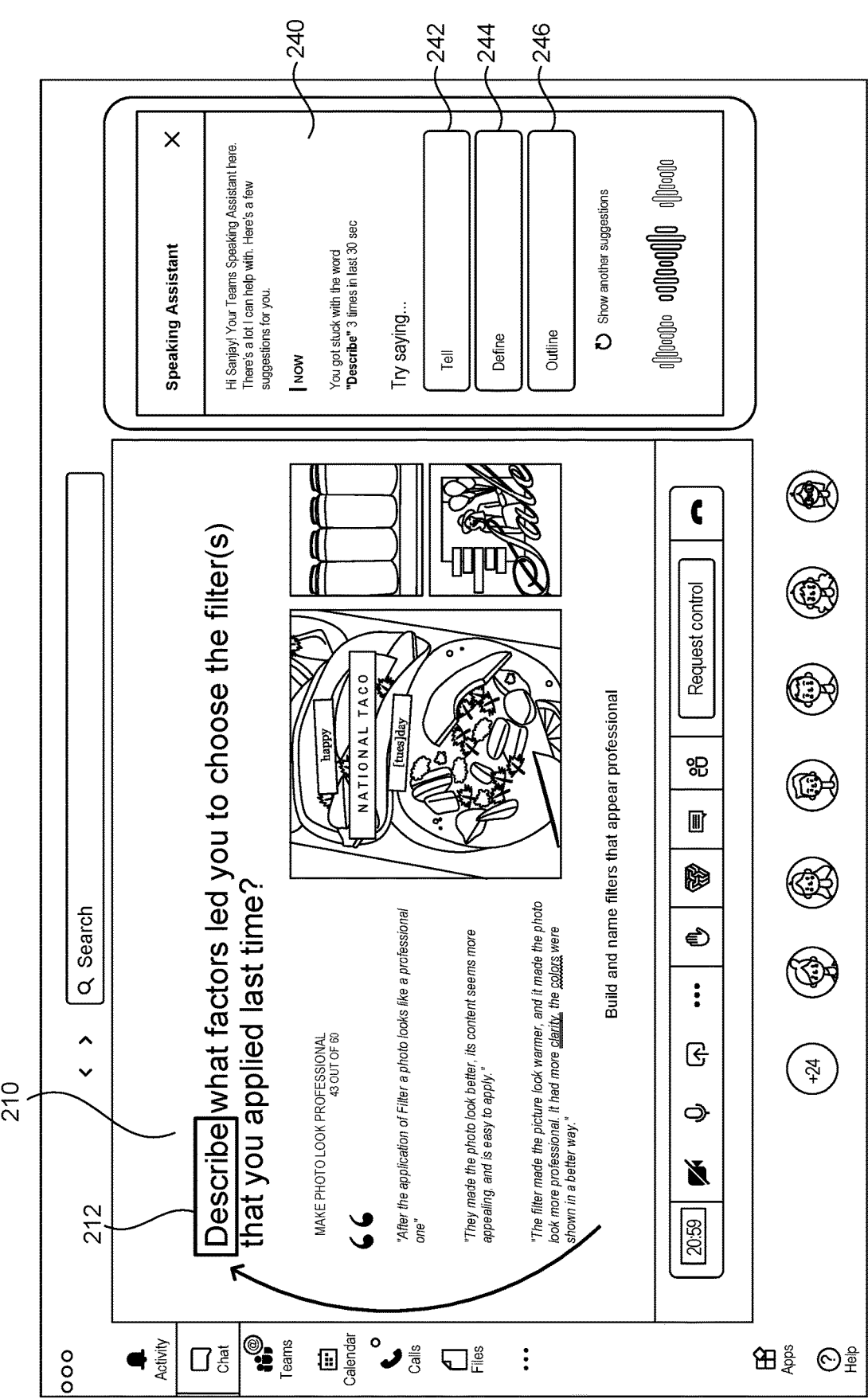
Figure 2D:
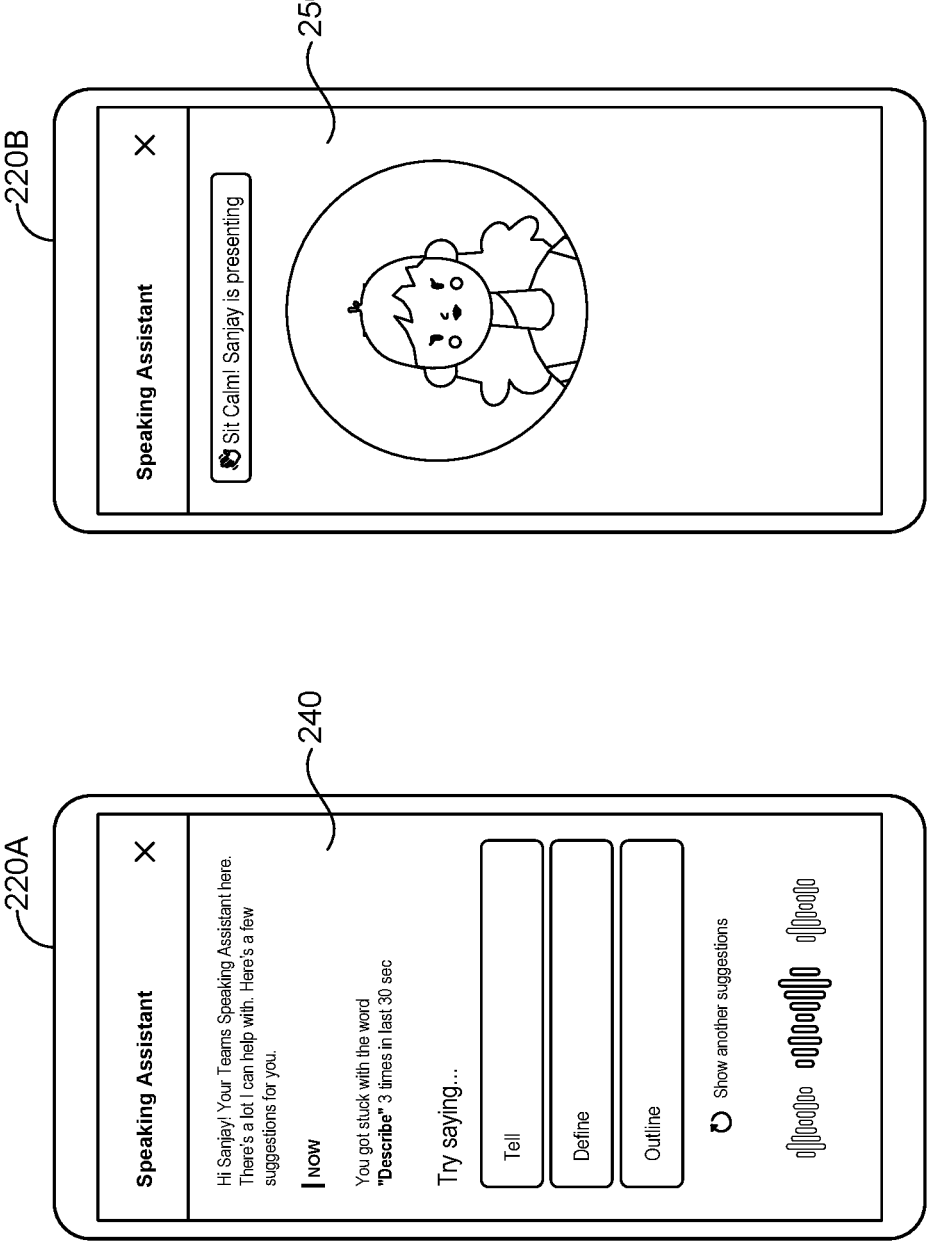

Turning to FIG. 2C, FIG. 2C includes presentation interface portion 210 having slide 212 that can be scanned to identify a disrupted-speech word (i.e., describe 214) that corresponds to the audio data. The alternative word interface 240 can include one or more alternative words (e.g., alternative word 242, alternative word 244, and alternative word 246) for a disrupted-speech word as a disrupted-speech interface element. FIG. 2D illustrates the notifications interface portion 220A of a speaker-attendee and a notifications interface portion 220B of an attendee. The notification interface portion 220A can include the alternative word interface 240 and the notification interface portion 22B can include a disrupted-speech instance notification 250.

FIGS. 2E, 2F, and 2G illustrate the speaking assistant status interface 260 having disrupted-speech feedback data 262; speaking assistant encouragement interface 270 having user encouragement information 272, and speaking assistant historical information interface 280 having historical disrupted-speech information 282 respectively.

Exemplary Methods

With reference to FIGS. 3, 4, and 5, flow diagrams are provided illustrating methods for providing a disrupted-speech assistance service associated with a disrupted-speech management engine of a meeting management system. The methods may be performed using the meeting management system described herein. In embodiments, one or more computer-storage media having computer-executable or computer-useable instructions embodied thereon that, when executed, by one or more processors can cause the one or more processors to perform the methods (e.g., computer-implemented method) in the meeting management system (e.g., a computerized system or computing system).

Turning to FIG. 3, a flow diagram is provided that illustrates a method 300 for providing a disrupted-speech assistance service associated with a disrupted-speech management engine of a meeting management system. At block 302, access, at a disrupted-speech management engine, meeting data of a meeting associated with a user. The meeting data comprises audio data. At block 304, determine that the audio comprises disrupted-speech at a threshold level of disrupted-speech. At block 306, execute one or more disrupted-speech assistance operations for the meeting. The one or more disrupted-speech assistance operations comprises identifying a disrupted-speech word based on the audio data and determining an alternative word for the disrupted-speech word. At block 308, cause generation of a disrupted-speech assistance interface based on the one or more disrupted-speech assistance operations. The disrupted-speech interface comprises the alternative word for the disrupted-speech word.

Turning to FIG. 4, a flow diagram is provided that illustrates a method 400 for providing a disrupted-speech assistance service associated with a disrupted-speech management engine of a meeting management system. At block 402, communicate, from a client device, meeting data of a meeting associated with a user. The meeting data comprising audio data. At block 404, receive a disrupted-speech word based on the audio data and an alternative word for the disrupted-speech word. The disrupted-speech word and the alternative word for the disrupted-speech word are associated with one or more disrupted-speech assistance operations of a disrupted-speech management engine. At block 406, cause presentation of a disrupted-speech assistance interface based on the one or more disrupted-speech assistance operations. The disrupted-speech assistance interface comprises the alternative word for the disrupted-speech word.

Turning to FIG. 5, a flow diagram is provided that illustrates a method 500 for providing a disrupted-speech assistance service associated with a disrupted-speech management engine of a meeting management system. At block 502, access a disrupted-speech dataset. The disrupted-speech dataset comprises a disrupted-speech machine-learning training dataset associated with one or more disrupted-speech assistance operations. At 504, train a disrupted-speech machine learning model. The disrupted-speech machine learning model supports predicting one or more disrupted-speech interface elements associated with a disrupted-speech assistance interface. At 506, deploy the disrupted-speech machine learning model to cause processing of disrupted-speech input data for predicting the one or more disrupted-speech interface elements.

Embodiments of the present invention have been described with reference to several inventive features (e.g., operations, systems, engines, and components) associated with a meeting management system having a meeting management engine and disrupted-speech management engine for providing a disrupted-speech assistance service associated with a disrupted-speech management engine of a meeting management system. Inventive features described include: operations, interfaces, data structures, and arrangements of computing resources associated with providing the functionality described herein relative with reference to meeting management engine and disrupted-speech management engine and user interfaces providing user interaction models. Functionality of the embodiments of the present invention have further been described, by way of an implementation and anecdotal examples to demonstrate that the operations for providing the disrupted-speech assistance service are an unconventional ordered combination of operations that operate with a disrupted-speech management engine as a solution to a specific problem in meeting management technology environment to improve computing operations and interfaces for user interface navigation in meeting management systems. Overall, these improvements result in less CPU computation, smaller memory requirements, and increased flexibility in meeting management systems when compared to previous conventional meeting management system operations performed for similar functionality.

Additional Support for Detailed Description of the Invention

Example Distributed Computing System Environment

Figure 6:
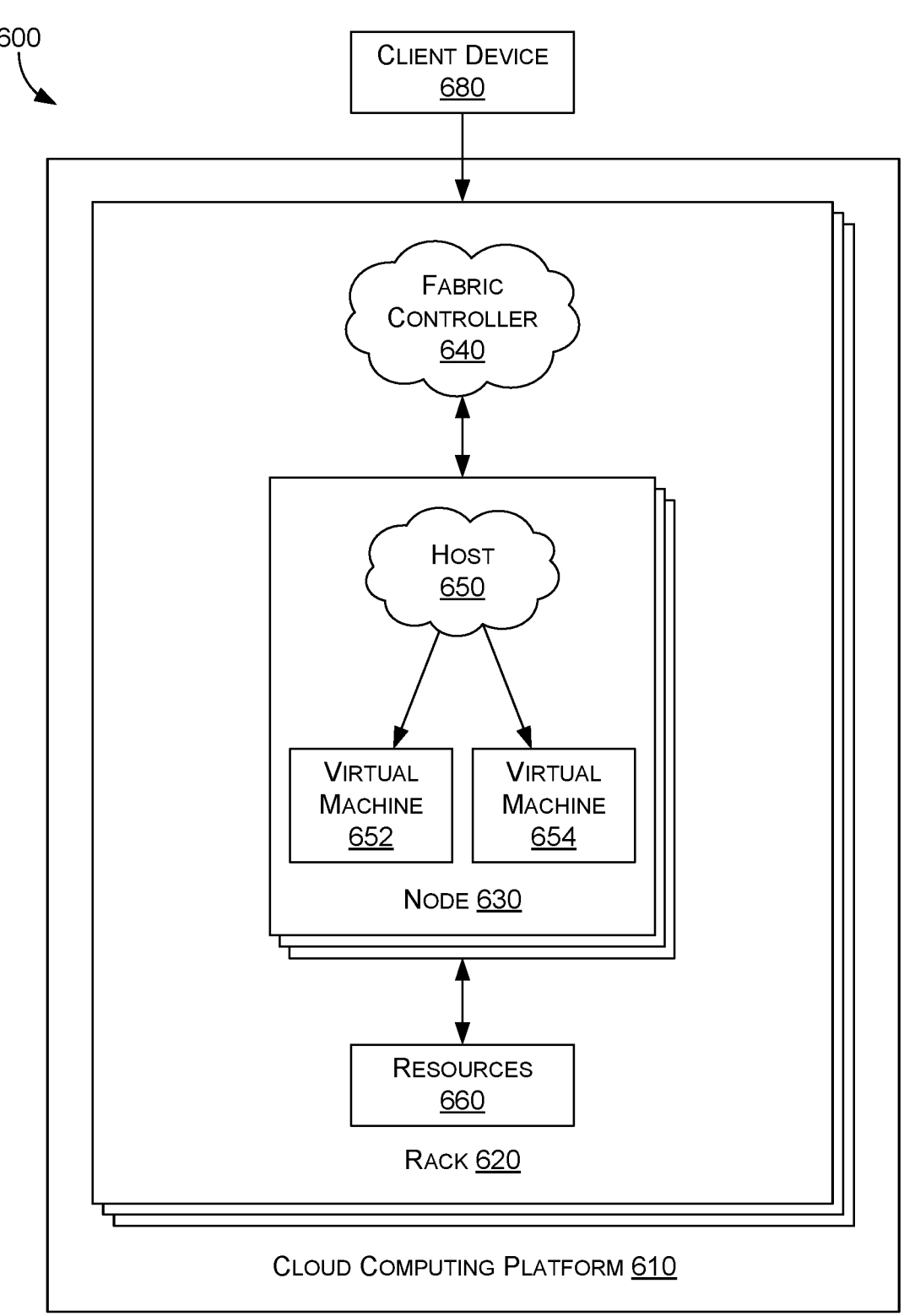
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform

610. Node 630 is allocated to run one or more portions of a service application of a tenant. A tenant can refer to a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Having briefly described an overview of embodiments of the present invention, an example operating environment in which embodiments of the present invention may be implemented is described below in order to provide a general context for various aspects of the present invention. Referring initially to FIG. 6 in particular, an example operating environment for implementing embodiments of the present invention is shown and designated generally as computing device 600. Computing device 600 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types.

The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 7:
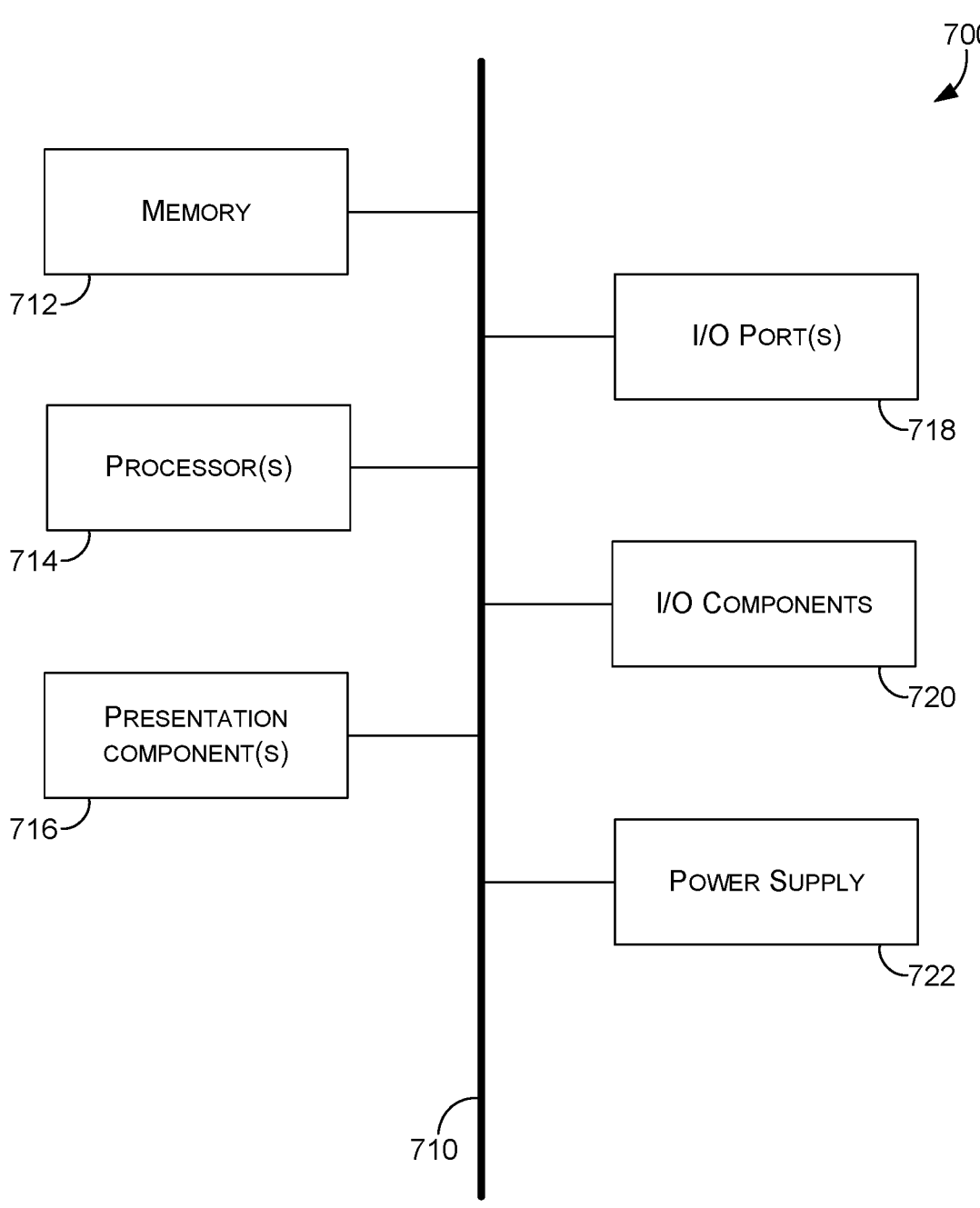
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system, the computerized system comprising:

at least one computer processor; and computer memory storing computer-useable instructions that, when used by the at least one computer processor, cause the at least one computer processor to perform operations comprising:

accessing, at a disrupted-speech management engine, meeting data of a meeting associated with a user, the meeting data comprising audio data and video data, wherein the meeting data is associated with a meeting management system for videoconferencing, wherein a disrupted-speech machine learning engine supports training one or more machine learning models based on a disrupted-speech machine learning training dataset comprising a disrupted-speech dataset associated with historical and contextual data of meetings, wherein the one or more machine learning models are utilized in performing disrupted-speech assistance operations, wherein the meeting management system and the one or more machine learning models support a disrupted-speech assistance service that is integrated into the meeting management system via the disrupted-speech management engine;

determining that the audio data comprises disrupted-speech at a threshold level of disrupted-speech;

based on the audio data comprising disrupted-speech at the threshold level of disrupted-speech, execute one or more disrupted-speech assistance operations for the meeting, wherein the one or more disrupted-speech assistance operations comprises:

identifying a disrupted-speech word based on the audio data; and;

determining an alternative word for the disrupted-speech word; and causing generation of a disrupted-speech assistance interface based on the one or more disrupted-speech assistance operations, wherein the disrupted-speech assistance interface comprises the alternative word for the disrupted-speech word, wherein the disrupted-speech assistance interface supports generating an indication of user encouragement when a determination is made that user has overcome an instance of disrupted-speech, wherein the disrupted-speech assistance interface includes each of: a digital assistant interface comprising the disrupted-speech word and the alternative word; an indication to attendees of the meeting that the user is experiencing disrupted-speech; an indication of user encouragement; and a disrupted-speech timeline comprising one or more instances of disrupted speech, wherein an instance of disrupted speech is associated with a timestamp and a count of a number times the disrupted-speech word was repeated.

2. The computerized system of claim 1, wherein the user is associated with a disrupted-speech user profile of the disrupted-speech assistance service.

3. The computerized system of claim 2 wherein the disrupted-speech user profile comprises the disrupted-speech dataset that is stored and utilized in performing the one or more disrupted-speech assistance operations.

4. The computerized system of claim 1, wherein determining that the audio data comprises disrupted-speech at the threshold level of disrupted speech is based on determining an occurrence frequency of consecutive phonemes within a predefined period of time.

5. The computerized system of claim 4, wherein determining that the audio data comprises disrupted-speech is further based on the video data of the meeting data, wherein the video data is analyzed for facial features associated with disrupted-speech to support determining that the audio data comprises disrupted-speech.

6. The computerized system of claim 1, wherein the disrupted-speech assistance interface supports communicating a disrupted-speech recovery reward based on audio data associated with the user and the alternative word, wherein the disrupted-speech recovery reward is generated based on the determination that the user has overcome the instance of disrupted-speech.

7. The computerized system of claim 1, wherein the one or more disrupted-speech assistance operations include each of:

initializing a digital assistant associated with generating the disrupted-speech assistance interface;

communicating an indication to attendees of the meeting that the user is experiencing disrupted-speech;

scanning one or more slides of a slide deck associated with the meeting to identify the disrupted-speech word;

personalizing the alternative word for the disrupted-speech word based on the disrupted-speech dataset associated with a disrupted-speech user profile of the user;

communicating the indication of user encouragement; and communicating a disrupted-speech recovery reward based on audio data associated with the user and the alternative word.

8. One or more computer-storage media having computer-executable instructions embodied thereon that, when executed by a computing system having a processor and memory, cause the processor to:

communicate, from a client device, meeting data of a meeting associated with a user, the meeting data comprising audio data and video data, wherein the meeting data is associated with a meeting management system for videoconferencing, wherein a disrupted-speech machine learning engine supports training one or more machine learning models based on a disrupted-speech machine learning training dataset comprising a disrupted-speech dataset associated with historical and contextual data of meetings, wherein the one or more machine learning models are utilized in performing disrupted-speech assistance operations, wherein the meeting management system and the one or more machine learning models support a disrupted-speech assistance service that is integrated into the meeting management system via a disrupted-speech management engine;

based on communicating the meeting data, receive a disrupted-speech word based on the audio data and an alternative word for the disrupted-speech word, wherein disrupted-speech word and the alternative word for the disrupted-speech word are associated with one or more disrupted-speech assistance operations of the disrupted-speech management engine; and cause presentation of a disrupted-speech assistance interface based on the one or more disrupted-speech assistance operations, wherein the disrupted-speech assistance interface comprises the alternative word for the disrupted-speech word, wherein the disrupted-speech assistance interface supports generating an indication of user encouragement when a determination is made that user has overcome an instance of disrupted-speech, wherein the disrupted-speech assistance interface includes each of: a digital assistant interface comprising the disrupted-speech word and the alternative word; an indication to attendees of the meeting that the user is experiencing disrupted-speech; an indication of user encouragement; and a disrupted-speech timeline comprising one or more instances of disrupted speech, wherein an instance of disrupted speech is associated with a timestamp and a count of a number times the disrupted-speech word was repeated.

9. The one computer-storage media of claim 8, wherein the user is associated with a disrupted-speech user profile of the disrupted-speech assistance service.

10. The one computer-storage media of claim 9, wherein the disrupted-speech user profile comprises the disrupted-speech dataset that is stored and utilized in performing the one or more disrupted-speech assistance operations.

11. The one computer-storage media of claim 8, wherein the disrupted-speech assistance interface supports communicating a disrupted-speech recovery reward based on audio data associated with the user and the alternative word, wherein the disrupted-speech recovery reward is generated based on the determination that the user has overcome the instance of disrupted-speech.

12. The one computer-storage media of claim 11, wherein the one or more disrupted-speech assistance operations include each of:

initializing a digital assistant associated with generating the disrupted-speech assistance interface;

communicating an indication to attendees of the meeting that the user is experiencing disrupted-speech;

scanning one or more slides of a slide deck associated with the meeting to identify the disrupted-speech word;

personalizing the alternative word for the disrupted-speech word based on the disrupted-speech dataset associated with a disrupted-speech user profile of the user;

communicating the indication of user encouragement; and communicating a disrupted-speech recovery reward based on audio data associated with the user and the alternative word.

13. The one computer-storage media of claim 8, wherein the disrupted-speech assistance interface includes each of:

a digital assistant interface comprising the disrupted-speech word and the alternative word;

an indication to attendees of the meeting that the user is experiencing disrupted-speech, the indication of user encouragement; and a disrupted-speech timeline comprising one or more instances of disrupted speech, wherein an instance of disrupted speech is associated with a timestamp and a count of a number times the disrupted-speech word was repeated.

14. A computer-implemented method, comprising:

accessing, at a disrupted-speech management engine, meeting data of a meeting associated with a user, the meeting data comprising audio data and video data, wherein the meeting data is associated with a meeting management system for videoconferencing, wherein a disrupted-speech machine learning engine supports training one or more machine learning models based on a disrupted-speech machine learning training dataset comprising a disrupted-speech dataset associated with historical and contextual data of meetings, wherein the one or more machine learning models are utilized in performing disrupted-speech assistance operations, wherein the meeting management system and the one or more machine learning model support a disrupted-speech assistance service that is integrated into the meeting management system via the disrupted-speech management engine;

determining that the audio data comprises disrupted-speech at a threshold level of disrupted-speech;

based on the audio data comprising disrupted-speech at the threshold level of disrupted-speech, execute one or more disrupted-speech assistance operations for the meeting, wherein the one or more disrupted-speech assistance operations comprises:

identifying a disrupted-speech word based on the audio data; and;

determining an alternative word for the disrupted-speech word; and causing generation of a disrupted-speech assistance interface based on the one or more disrupted-speech assistance operations, wherein the disrupted-speech assistance interface comprises the alternative word for the disrupted-speech word, wherein the disrupted-speech assistance interface supports generating an indication of user encouragement when a determination is made that user has overcome an instance of disrupted-speech, wherein the disrupted-speech assistance interface includes each of: a digital assistant interface comprising the disrupted-speech word and the alternative word; an indication to attendees of the meeting that the user is experiencing disrupted-speech; an indication of user encouragement; and a disrupted-speech timeline comprising one or more instances of disrupted speech, wherein an instance of disrupted speech is associated with a timestamp and a count of a number times the disrupted-speech word was repeated.

15. The computer-implemented method of claim 14, wherein determining that the audio data comprises disrupted-speech at the threshold level of disrupted speech is based on determining an occurrence frequency of consecutive phonemes within a predefined period of time.

16. The computer-implemented method of claim 15, wherein determining that the audio data comprises disrupted-speech is further based on the video data of the meeting data, wherein the video data is analyzed for facial features associated with disrupted-speech to support determining that the audio data comprises disrupted-speech.

17. The computer-implemented method of claim 14, wherein the disrupted-speech assistance interface supports communicating a disrupted-speech recovery reward based on audio data associated with the user and the alternative word, wherein the disrupted-speech recovery reward is generated based on the determination that the user has overcome the instance of disrupted-speech.

18. The computer-implemented method of claim 14, wherein the one or more disrupted-speech assistance operations further each:

initializing a digital assistant associated with generating the disrupted-speech assistance interface;

communicating an indication to attendees of the meeting that the user is experiencing disrupted-speech;

scanning one or more slides of a slide deck associated with the meeting to identify the disrupted-speech word;

personalizing the alternative word for the disrupted-speech word based on the disrupted-speech dataset associated with a disrupted-speech user profile of the user;

communicating the indication of user encouragement; and communicating a disrupted-speech recovery reward based on audio data associated with the user and the alternative word.

19. The computer-implemented method of claim 14, wherein the disrupted-speech assistance interface further comprises each of:

a digital assistant interface comprising the disrupted-speech word and the alternative word;

an indication to attendees of the meeting that the user is experiencing disrupted-speech;

the indication of user encouragement; and a disrupted-speech timeline comprising one or more instances of disrupted speech, wherein an instance of disrupted speech is associated with a timestamp and a count of a number times the disrupted-speech word was repeated.

* * * * *